United States Patent
Taylor et al.

(10) Patent No.: US 11,523,153 B2
(45) Date of Patent: *Dec. 6, 2022

(54) SYSTEM AND TECHNIQUES FOR DIGITAL DATA LINEAGE VERIFICATION

(71) Applicant: Capital One Services, LLC, McLean, VA (US)

(72) Inventors: Kenneth Taylor, Champaign, IL (US); Austin Grant Walters, Savoy, IL (US); Jeremy Edward Goodsitt, Champaign, IL (US); Fardin Abdi Taghi Abad, Champaign, IL (US); Reza Farivar, Champaign, IL (US); Vincent Pham, Champaign, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 193 days.

This patent is subject to a terminal disclaimer.

(21) Appl. No.: 17/063,843

(22) Filed: Oct. 6, 2020

(65) Prior Publication Data

US 2021/0037270 A1    Feb. 4, 2021

Related U.S. Application Data

(63) Continuation of application No. 16/787,265, filed on Feb. 11, 2020, now Pat. No. 10,841,628, which is a continuation of application No. 16/526,003, filed on Jul. 30, 2019, now Pat. No. 10,602,202.

(51) Int. Cl.
*H04L 29/06* (2006.01)
*H04N 21/235* (2011.01)
*H04N 21/845* (2011.01)
*H04L 9/06* (2006.01)
*G06F 16/48* (2019.01)
*H04L 9/00* (2022.01)

(52) U.S. Cl.
CPC ......... *H04N 21/2353* (2013.01); *G06F 16/48* (2019.01); *H04L 9/0643* (2013.01); *H04N 21/8455* (2013.01); *H04L 9/50* (2022.05)

(58) Field of Classification Search
CPC ............ H04N 21/2353; H04N 21/8455; H04L 9/0643; H04L 9/50; G06F 16/48
USPC ........................................................ 726/2
See application file for complete search history.

(56) References Cited

U.S. PATENT DOCUMENTS

2020/0159696 A1 * 5/2020 Adluri ...................... H04L 9/14
2020/0382283 A1 * 12/2020 Irazabal .................. G06F 7/556

* cited by examiner

*Primary Examiner* — Evans Desrosiers
(74) *Attorney, Agent, or Firm* — KDB

(57) ABSTRACT

Disclosed are examples for providing functions to receive a media file to be stored in a media repository. In the examples, a location in the media repository may be assigned to the media file. A media file address in a blockchain platform may be assigned to the media file. Metadata including the assigned location in the media repository and the assigned media file address in the blockchain platform may be added to the media file. A media file hash value may be generated by applying a hash function to the media file including the metadata. The media file hash value may be included in a message and uploaded to the assigned media file address in the blockchain platform as a transaction in the blockchain. An indication that the media file is uploaded to the media repository may be delivered to a subscriber device from which the media file was received.

18 Claims, 8 Drawing Sheets

SYSTEM AND TECHNIQUES FOR DIGITAL DATA LINEAGE VERIFICATION

RELATED APPLICATION

This application is a continuation of U.S. patent application Ser. No. 16/787,265, filed Feb. 11, 2020, which is a continuation of U.S. patent application Ser. No. 16/526,003, filed Jul. 30, 2019 (now U.S. Pat. No. 10,602,202), both titled "SYSTEM AND TECHNIQUES FOR DIGITAL DATA LINEAGE VERIFICATION". The contents of the aforementioned applications are incorporated herein by reference in their entirety.

BACKGROUND

With the proliferation of image and video editing applications and tools, it is becoming more difficult and time consuming to determine whether an image or a video is an original image or video or if the image or video has been altered in some manner. Alterations to the actual image or video content may take many forms from esthetic changes, such as adjusting color balance, changing video image brightness or the like, to changes that may be more nefarious, such as altering audio, replacing individuals with other individuals, adding or removing individuals, deleting scenes from or adding scenes to the image or video, or the like. In other cases, data related to the image or video may be altered. For example, metadata that may indicate a time, source, location or other information related to the image or video may also be altered for various reasons, both good and bad.

Various systems have been developed to prevent or at least indicate to a viewer of the image that the image is in a different state than when the image was originally provided to the distributor of the image. While these system may use cryptographic techniques or techniques involving blockchain technology, these systems appear to be limited to still images and do not seem applicable to video. Moreover, the techniques used by prior systems require altering of the original images by adding information used to authenticate the image file. This required alteration of the original images by the prior systems increases the opportunity for errors and surreptitious takeover of the authentication means.

Therefore, a need exists for a system and techniques for protecting original image and video (and audio) content authenticating data lineage without modifying original content and enabling authenticating data lineage of video data to also be authenticated.

SUMMARY

Disclosed is an example of a system that includes a blockchain platform, a media repository and application programming code. The blockchain platform may have a number of transactions stored in a blockchain formed from blocks of records containing transactions. The media repository may be operable to store media files and may be coupled to the blockchain platform. Application programming code may be stored in a memory of a subscriber device. Upon execution of the application programming code, the application programming code is operable to enable the subscriber device to receive an original media file for storage in the media repository. The original media file may include metadata and may be a video file encoded with intra-frames and delta-frames and. An authentication hash function may be applied to the original media file including the metadata. The original media file including the metadata is unaltered from a state in which the original media file is received, and the authentication hash function utilizes an authentication key. An original media file hash value is obtained from the authentication hash function and the original media file is uploaded to the media repository. The original media file hash value may be inserted in a message to be uploaded in a transaction to the blockchain platform. The transaction is uploaded to the blockchain platform. An indication is generated in the graphical user interface for presentation on the display device that the original media file was successfully uploaded to the media repository and the transaction was successfully uploaded to the blockchain platform.

An example of a method is disclosed that includes retrieving, by application programming code executing on a subscriber device, a media file from an assigned location within a media repository. The retrieved media file is a previously-stored media file that includes content and metadata. The metadata may include a media file address in a blockchain platform related to the previously-stored media file. The media file address in the blockchain platform may be obtained from the metadata of the retrieved media file. The media file address in the blockchain platform may provide access to a blockchain transaction related to the retrieved media file. A hash value related to the retrieved media file may be retrieved from a transaction in the blockchain platform at the media file address. The retrieved hash value may be stored in a message within the transaction at the media file address. The authenticity of the media file may be confirmed utilizing the retrieved hash value. In response to confirming the authenticity of the media file, the media file may be altered by modifying content of the media file or metadata parameters in the media file to create an altered media file. A message including an indication of altered data within the altered media file may be uploaded as a subsequent transaction to the media file address in the blockchain platform. The message may include an indication of altered data within the media file. The altered media file may be sent to be stored in the media repository at a memory address location related to the assigned location of the retrieved media file within the media repository.

An example of a non-transitory computer readable medium embodying programming code is disclosed. The example programming code when executed by a processor causes the processor to perform functions and provides functions to receive a media file to be stored in a media repository. A location in the media repository may be assigned to the media file. A media file address in a blockchain platform may be assigned to the media file. A metadata may be added to the media file. The metadata may include the assigned location in the media repository and the assigned media file address in the blockchain platform. A media file hash value may be generated by applying a hash value to the media file including the metadata. The media file hash value may be uploaded in a message as a transaction in the blockchain to the assigned media file address in the blockchain platform. An indication may be delivered to application programming code executing on a subscriber device from which the media file was received. The indication indicates the received media file is uploaded to the media repository, the media file hash value has been uploaded to the blockchain platform, and a state of the received media file is a secured state.

DETAILED DESCRIPTION

Figure 1:
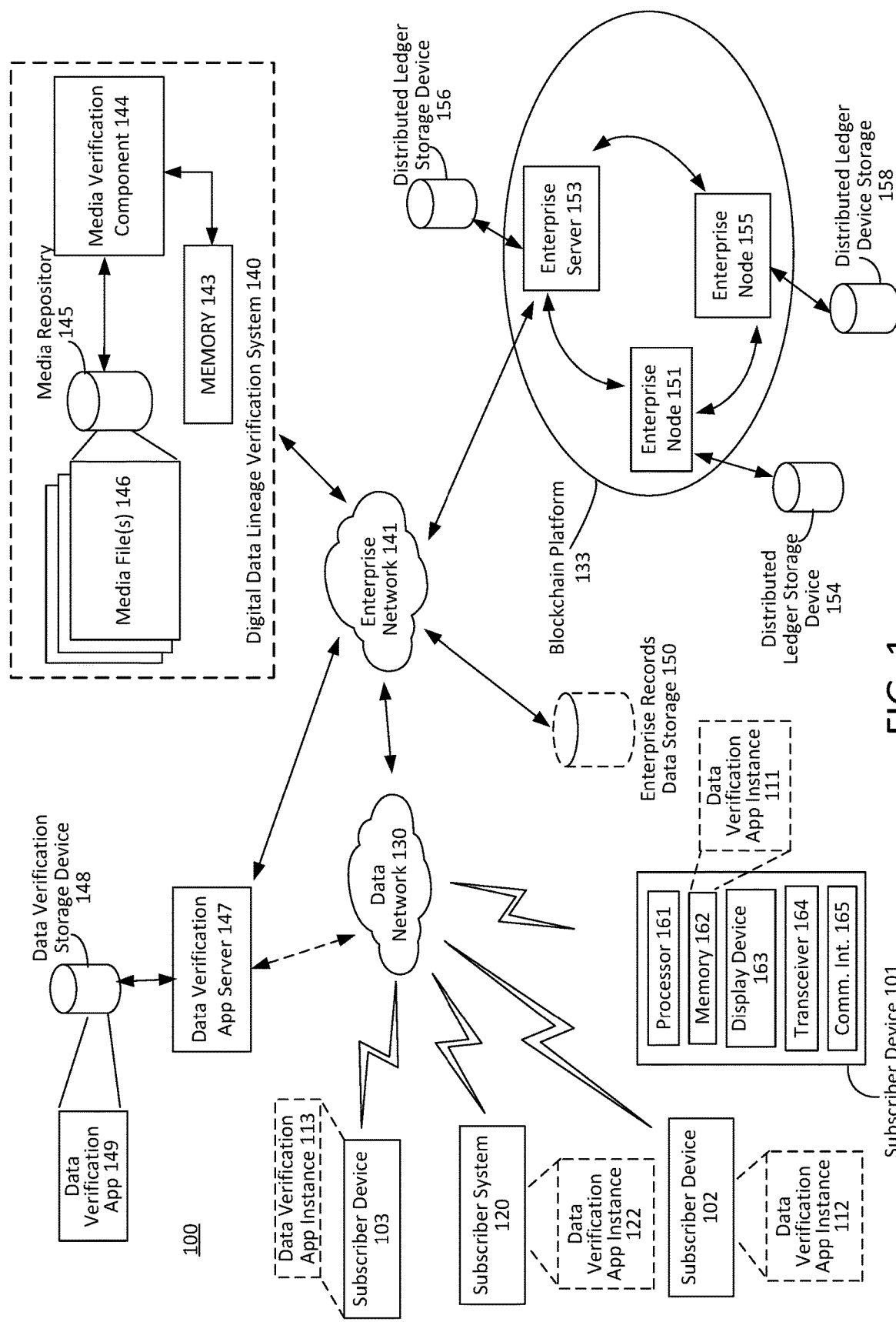
FIG. 1 illustrates an example of an implementation of a system for providing data lineage authentication as described herein.

Examples disclosed herein provide techniques and a system for a digital data lineage verification. Digital data lineage verification may be, in an example, the capability of a system to verify the integrity of a digital media file. For example, the integrity of a digital media file may include verifying a source of the digital media file, whether the digital media file has been altered or tampered with or the like.

With general reference to notations and nomenclature used herein, one or more portions of the detailed description which follows may be presented in terms of processes executed on a computer or network of computers. These procedural descriptions and representations are used by those skilled in the art to most effectively convey the substances of their work to others skilled in the art. A process is here, and generally, conceived to be a self-consistent sequence of operations leading to the desired result. These operations are those requiring physical manipulations of physical quantities. Usually, though not necessarily, these quantities take the form of electrical, magnetic, or optical signals capable of being stored, transferred, combined, compared, and otherwise manipulated.

Further, these manipulations are often referred to in terms, such as adding or comparing, which are commonly associated with mental operations performed by a human operator. However, no such capability of a human operator is necessary, or desirable in most cases, in any of the operations described herein that form part of one or more examples. Rather, these operations are machine operations that cannot reasonably be performed by humans. Useful machines for performing operations of various examples include digital computers as selectively activated or configured by a computer program stored within a memory device and that is written in accordance with the teachings herein, and/or include apparatus specially constructed for the required purpose or a digital computer. Various examples also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements. In the following description, for the purpose of explanation, numerous specific details are set forth in order to provide a thorough understanding thereof. It may be evident, however, that the novel examples can be practiced without these specific details. In other instances, well-known structures and devices are shown in block diagram form in order to facilitate a description thereof. The intention is to cover all modification, equivalents, and alternatives within the scope of the claims.

FIG. 1 illustrates an example of an implementation of a system for providing data lineage authentication as described herein. The example system 100 may implement a subscriber model in which a subscriber via a computing device subscribes to and uses a digital data lineage verification service as described herein. The digital data lineage verification service may, for example, enable a subscriber to upload a media file, such as a video, an image file, or both, to a digital data lineage verification system to provide verification of the source and integrity of the media file. The extent of the integrity of the media file may be measured based on an extent of unauthorized modifications to the content of the media file, the media file extension, the file name, a definition of the video, the metadata related to the media file, and/or other related elements.

The example system 100 shown in FIG. 1 includes a blockchain platform 133, a data lineage verification system 140, an enterprise network 141, a data network 130, a data verification application server 147, and subscriber devices, such as 101, 102 and 103, or subscriber system 120. The system 100 may include systems with access to a blockchain platform 133 over data network 130. The blockchain platform 133 may, for example, have a number of transactions stored in blocks of records distributed among members of the blockchain platform 133, such as an enterprise node 151, an enterprise node 155 and an enterprise server 153. The media repository 145 may be operable to store data. The data network 130 may be coupled to the blockchain platform 133 and the digital data lineage verification system 140. The data verification application (app) server 147 may be coupled to the blockchain platform 133 via the enterprise network 141 (or via the data network 130). The data verification application server 147 may be coupled to a data verification storage device 148. The data verification storage device 148 may store a data verification application (app) 149, which is, for example, application programming code that enables a subscriber device that executes the data verification application to perform different functions. In addition, the data verification application server 147 may be operable to execute programming code that enables the data verification application server 147 to download application programing code to a subscriber device, such as subscriber device 101, 102, 103.

The digital data lineage verification system 140 may include a memory 143, a media verification component 144 and a media repository 145. The memory 143 may include programming code that upon execution enables a processor to perform the functions related to a digital data lineage verification service as described with reference to later examples. The media verification component 144 may be operable to perform various functions with respect to verifying the authenticity of a media file and the integrity of a source of a media file, indicating a result of the verifying, and other verification-related functions. Details of the functions of the media verification component 144 are described in more detail below. The media repository 145 may store a number of media files, such as 146, that may be image files or video files. The media files 146 may be provided by subscriber devices, such as 101-103, via the respective instances of the data verification applications, such as 111, 112 and 113, operating on the respective subscribers' devices 101, 102 and 103. Similar to the subscriber device, but on a larger scale may be a subscriber system, such as 120, that may encompass a number of subscriber devices.

The subscriber system 120 may be a publisher, a video streaming service or the like, that subscribes to enterprise services, such as the digital data lineage verification service provided by the digital data lineage verification system 140. The subscriber system 120 may provide access to an instance of a data verification application such as 122 for use by a number of subscriber devices within the subscriber system 120. The respective subscriber devices 101-103 and the subscriber system 120 may be sources of original media files that are provided to the digital data lineage verification system 140 for secure storage and digital data lineage verification services of the original media files. In addition, the respective subscriber devices 101-103 and the subscriber system 120 may provide media files received from other sources to the digital data lineage verification system for authentication of the media file as a media file original to the source and the integrity of the source of the media file as a verifiable owner of the provided media file. In an example, an initial transaction may be stored in the blockchain platform at the media file address. In the example, the initial transaction may include an original media hash value related to an original version of the media file.

In the following discussion, a subscriber device, such as 101-103, may be referred to frequently with respect to the described examples but it should be understood that the discussion and illustrated examples apply equally to a subscriber system, such as 120.

In the example of FIG. 1, subscriber device 101 is shown having multiple components including a processor 161, a memory 162, a display device 163, a transceiver 164, and a communication interface 165. Respective subscriber devices 102 and 103 may include components similar to those included in subscriber device 101. Of course, the respective subscriber devices 101-103 may include additional components. The respective subscriber devices 101, 102, and 103 may be communicatively coupled via the transceiver and communication interface to the data network 130 and to the enterprise network 141. Via the data network 130 and the enterprise network 141, the respective subscriber devices 101, 102 and 103 may be coupled to the data verification application server 147, the blockchain platform 133, and the digital data lineage verification system 140. Via the coupling to the digital data lineage verification system 140, the respective subscriber devices may have access to the media repository 145 and the media files 146 stored therein. Each of the subscriber devices 101, 102, and 103 may include an instance of a data verification application stored in their respective memories. For example, subscriber device 101 may download and implement data verification application instance 111 that is stored in memory 162, subscriber device 102 may download and implement data verification application instance 112, and subscriber device 103 may download and implement data verification application instance 113. The structural features of a subscriber device are explained in more detail with reference to another example.

Subscriber devices 101, 102, and 103 may be configured to store messages in blockchain platform 133. In one or more examples, each respective subscriber device 101, 102 and 103 may be configured to add blocks containing the messages to blockchain platform 133. Alternatively, each respective subscriber device 101, 102, and 103 may be configured to provide the messages to an authorized system, such as digital data lineage verification system 140. The authorized system may be configured to add blocks containing the messages to blockchain platform 133. An example of a subscriber device, such as 101, 102 or 103, may include a display device, a memory, a graphical user interface provided by application programming code, and processor. A more in-depth discussion of functions performed by a processor of a subscriber device is made with reference to later examples.

The system 100 is operable to generate a non-reputable record of transactions that memorialize interactions with (e.g., change of content, such as a pixel value change or the like) the original media file and with respect to (e.g., a change in a timestamp or other metadata parameter) the stored original media file) using the blockchain platform 133.

Blockchain platform 133 may include a distributed data structure, consistent with disclosed examples. In an example, the blockchain platform 133 may be a private blockchain. For example, enterprise nodes 151, 153, and enterprise system 155 may store copies of the blockchain platform 133 in respective data ledger storage devices 154, 156, and 158. These enterprise nodes 151, 153, and enterprise system 155 may be configured and operable to add blocks to blockchain platform 133 and publish the blocks to other authorized systems. In addition, the enterprise nodes 151, 153 and enterprise system 155 may serve as access points to the blockchain platform 133. The enterprise nodes 151, 153 and enterprise system 155 may be configured to receive messages from other systems, such as subscriber system 120 or respective subscriber devices 101, 102 and 103, for publication in blockchain platform 133. These other systems, such as subscriber devices 101, 102, 103 and subscriber system 120 may, for example, have read-only access to blockchain platform 133. As described with respect to FIG. 1, blockchain platform 133 may be configured to store messages from subscriber system 120, subscriber devices 101-103, and/or the digital data lineage verification system 140, the messages may include one or more hash values related to the media file. For example, the one or more hash values may be included in the messages maintained in the blockchain of the blockchain platform 133. Examples of the one or more hash values include an original media file hash value, a media file hash value, an altered data hash value, an intra-frame hash value, a frame hash value, a resulting hash value, a metadata hash value, a delta-frame hash value, a video hash value or a previous block's hash value. Each of the respective hash values may be generated using the same hash function, but different inputs to the hash function or the hash function may be applied to different inputs, such as an intra-frame of a media file. Note input to and applied to refer to the same operation with respect to the hash function and may be used interchangeably. In addition, an intra-frame is the same as an intra-frame and may be used interchangeably.

In the examples, an original media file hash value may be a hash value generated by a hash function applied to the entire original media file, parts of the media file including an intra-frame, a frame, a delta-frame, or the metadata, or to any combination of the intra-frame, the frame, the delta-frame, or the metadata of the media file. A video hash value may be a hash value generated by applying a hash function to a media file that is a video that has been provided for authentication and source verification. Similarly, a media file hash value may be a hash value generated by applying a hash function to a media file, which may be a video, a still image, a series of still images or the like, that has been presented or provided for authentication and source verification. An altered data hash value may be a hash value generated by applying a hash function to a media file that includes modified content or modified metadata that has been presented or provided for authentication and source verification, and a retrieved hash value is also input into the hash function. An intra-frame hash value may be a hash value generated by applying a hash function to an intra-frame, such as an intra-frame, of a media file that is a video. A resulting hash value may be a hash value generated by applying a hash function to a media file that has been presented or provided for authentication and source verification. A metadata hash value may be a hash value generated by applying a hash function to a portion of the metadata, which may include less than or all of the metadata, of a media file that has been presented or provided as an original media file for secure storage or for authentication and source verification. A delta-frame hash value may be a hash value generated by applying a hash function to a delta-frame of a media file that is a video. A video hash value may be a hash value generated by applying a hash function to part of an entire video, a frame of the video, an intra-frame or intra-frame of the video, a delta-frame of the video, or a segment of the entire video. A previous block's hash value is a hash value of a previous block in the blockchain maintained in the blockchain platform.

The digital data lineage verification system may also have different state designations for the media files, such as a secured state, an altered state, a duplicate state, a corrupted state, and a pirated state. A secured state may mean the media file is uploaded to the blockchain platform and is therefore secure. An altered state may mean that the media file has been altered as compared to a prior version of the media file stored in the media repository and according to information related to the prior version of the media file stored in the blockchain. A corrupted state may mean the media file is damaged or corrupted and data is missing or unreadable. A pirated state may be an indication that the media file is a copy of a media file that has been illegally or impermissibly copied but not necessarily by the source of the media file. For example, anti-copying technology exists that inserts an indicator that the media file has been copied.

Furthermore, the blockchain platform 133 can be distributed across several computing systems, such as the enterprise server 153 and enterprise nodes 151 and 155. The enterprise server 153 may perform functions similar to the functions performed by the enterprise nodes 151 and 155 as well as additional administrative or high-level functions, such as those related to the operation of the blockchain platform 133. Each node within the blockchain platform 133 may be coupled to a storage device (e.g., a high capacity memory device or the like) that stores all of the transactions of the blockchain platform 133. For example, the enterprise server 153 is coupled to the distributed ledger storage device and enterprise nodes 151 and 155. Thus, encouraging trust in the validity of the records stored in the blockchain platform 133. In this manner, the disclosed systems provide an innovative technical solution to at least the above-mentioned technical problems with conventional systems.

The data network 130 may be configured to provide communications between the components of FIG. 1 and may be one or a combination of: a Bluetooth network, a wide area network (WAN), a Wi-Fi network, a cellular network (e.g., long-term evolution (LTE), 5G or the like), or the like. The data network 130 is operable to provide communications, exchanges information, and/or facilitate the exchange of information between the respective subscriber devices 101-103 and subscriber system 120 and components, such as the blockchain platform 133, the data verification application server 147, or digital data lineage verification system 140, coupled to the enterprise network 141. Optionally, in an example, the data verification application server 147 shown coupled to the enterprise network 141 may be coupled directly to the data network 130 in addition to the enterprise network 141.

The enterprise network 141 may be a data network within an enterprise (not shown), such as a financial institution, a data center, or the like. The enterprise network 141 may facilitate and maintain security for the components coupled to the enterprise network 141. For example, the enterprise network 141 may provide authentication and other services to ensure subscriber devices 101-103 are authorized to couple to and use services provided by components, such as the digital data lineage verification system 140, coupled to the enterprise network 141. Components communicatively coupled to the enterprise network 141 may include the data verification application server 147, the blockchain platform 133, the digital data lineage verification system 140 and, optionally, the enterprise records data storage 150. The enterprise records data storage 150 may include, for example, records related to access level permissions, authentication certificates and the like related to computing devices, such as the subscriber devices 101-103 and systems (not shown), such as subscriber system 120. The records stored in the enterprise records data storage 150 may be used to authenticate respective subscriber devices and systems.

It may be helpful to discuss an operational example with reference to the system 100 of FIG. 1. The various components (e.g., subscriber devices 101-103, data verification application server 147, blockchain platform 133, and digital data lineage verification system 140, and the like) of system 100 may be operable to implement the functions of the following operational example. In the foregoing example, a subscriber may wish to confirm a source and verify the ownership and content of a media file stored in the media repository with verification information stored in the blockchain platform 133. The source may provide information related to the media file to the subscriber device for confirmation and verification purposes. Of course, examples of other scenarios may utilize a process similar to that illustrated in the foregoing example.

Figure 2:
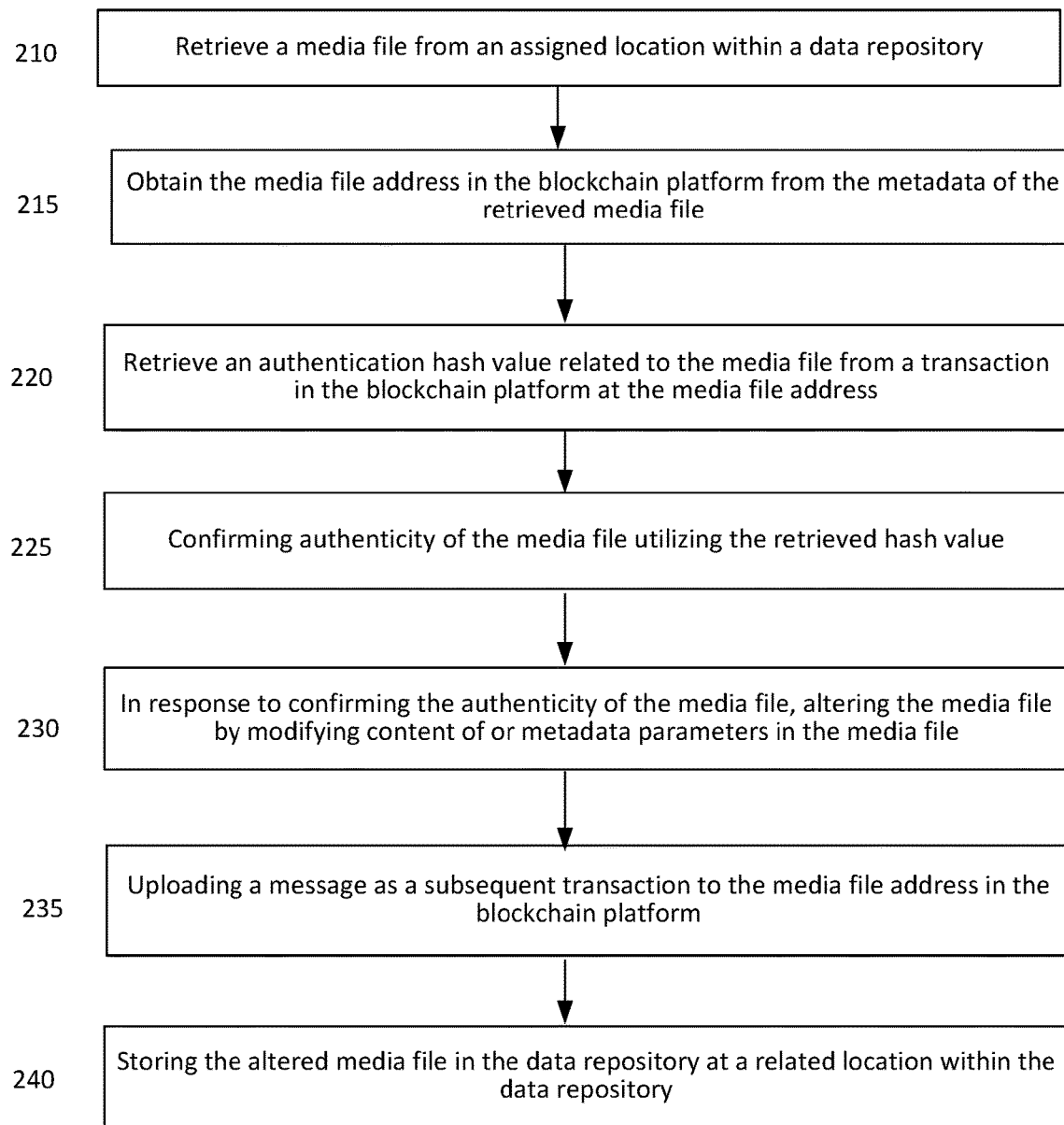
FIG. 2 illustrates a flow chart of an example of a process for authenticating and modifying a media file utilizing the system example of FIG. 1.

FIG. 2 illustrates a flow chart of an example of a process for authenticating and modifying a media file utilizing the system example of FIG. 1. The operational example may include implementation of process 200 that may be from the viewpoint of a subscriber device, such as 101, or subscriber system that presents a copy of a media file for authentication to a digital data lineage verification service. The subscriber device or subscriber system may access a media file stored in the media repository, such as 145 of FIG. 1. For example, a processor of a subscriber device 101-103 or a subscriber system 120 may retrieve a media file from an assigned location within a media repository (at 210). In the example, the media file includes content and metadata. The content of the media file may be, for example, video content, which may include audio content as well as multiple encoded video frames. In other examples, the content may be a still image or still images, text (such as a document), numerical data (such as a financial database or results of an experiment), or the like. In a further example, the content of the media file may be one of: a surveillance video of a physical location related to an entity, a trusted document related to an entity, an image generated by a camera, a graphic image, a contract document, a manuscript, a bank record, a conversation transcript (audio and/or textual), an identification of a person, or the like. Identification of a person may include an image of the person, details that uniquely identify the person (i.e., fingerprints, retinal scan, voice print or the like), residence address information or the like.

In a further process example, prior to retrieving the media file, an initial or original media file may be generated by the subscriber device or subscriber system, or a different subscriber device or subscriber system that aims to authenticate the media file that is about to be retrieved from the media repository. The initial media file may, for example, include unaltered content that was generated by an entity. The entity may be, for example, a video production facility, a video streaming service, a content provider, a financial institution, or the like. In the example process, the initial media file may be stored in an assigned location (e.g., a memory address) within the media repository. The assigned location may be related to the entity. For example, the entity may be assigned a sector of a redundant array of independent disks (RAID) storage device or the like. In response to storing the initial media file in the assigned location within the media repository, a transaction may be uploaded to the blockchain with reference to the media file address in the blockchain platform. The uploaded transaction may, for example, include at least one of an indication that the media file is related to the entity, or an indication of status information related to the initial media. The status information may, for example, include at least one of a timestamp related to storing of the media file in the media repository, an indication of a size of the media file, an indication of a format of the content of the media file, or a reference, such as a name, identifier, an address in the blockchain or the like, to a source (i.e. an author, a photographer, videographer, or the source's employer, or the like) of the media file that is the subject of the uploaded transaction.

Returning to the illustrated process 200 of FIG. 2, the metadata may, for example, include a media file address in the blockchain platform that is related to the media file. The media file address in the blockchain platform may provide access to a blockchain transaction related to the media file. At 215, the media file address in the blockchain platform may be obtained from the metadata of the retrieved media file.

An authentication hash value related to the media file may be retrieved from a transaction in the blockchain provided by the blockchain platform at the media file address (220). The hash value related to the media file may be stored as a message within the transaction at the media file address. In an example, the retrieved hash value may be an original media file hash value generated when the media file was initially stored in the media repository and processed for authentication via the blockchain platform.

At 225, the authenticity of the media file may be confirmed utilizing the retrieved hash value. For example, an authentication process may use the retrieved hash value to confirm the authenticity of the media file presented for authentication and/or the source of the media file. The authentication process may include processing the media file to retrieve the media file address in the blockchain. A hash function may be applied to the media file using an authentication key to produce an authentication hash value. The authentication hash value may be compared to the retrieved hash value. In response to the comparison yielding a match between the authentication hash value and the retrieved hash value, a message including an authentication result confirming the authenticity of the media file retrieved from the media repository may generate.

Conversely, a request for confirmation of the authenticity of a media file presented as an original media file may be sent, via the data network, to a digital data lineage verification system. The request may include the media file to be confirmed. A signal may be received from the digital data lineage verification system that a match between the presented media file and media files stored in the media repository was not found. In response to receipt of the signal, an indication for presentation in the graphical user interface may be generated that the media file to be confirmed does not match any media file stored in the media repository. An indication may be presented via the graphical user interface provided by the application programming code, such as a data verification application instance executing on a subscriber device, on the display device of a subscriber device.

In response to confirming the authenticity of the media file (230), the media file may be altered by modifying the content of or metadata parameters in the media file. For example, the subscriber may desire to modify the content of the previously-stored media file for some purpose, such as advertising or the like, or indicate in the metadata that ownership of the media file has been transferred to another entity or subscriber. After altering the content or metadata, a hash function may be applied to the altered media file to generate an altered data hash value. The altered data hash value may be based on the altered data of the media file, and, in some examples, the retrieved hash value may be used in the generation of the altered data hash value. The altered data hash value may be added to a message that is uploaded to the blockchain platform as the subsequent transaction. For example, the message may be uploaded as a subsequent transaction to the media file address in the blockchain platform (235). The message may include an indication of altered data within the media file.

In a further example related to the uploaded message, the media file may be determined to be a video file. In an example, the video file if an encoded video file may include a number of intra-frames and a number of delta-frames. As is known, the video includes a number of frames. An intra-frame may include all of the data of a respective video frame of the original video, while a delta-frame may include information related to changes in the data of the respective intra-frame and therefore does not include all of the data of an intra-frame. Some number of intra-frames may be extracted from the media file. A hash function may be applied to an extracted intra-frame or a number of extracted intra-frames to generate an intra-frame hash value for the respective intra-frame. The intra-frame hash value for the respective intra-frame may be inserted into the message to be uploaded as the subsequent transaction.

Alternatively, a number of delta-frames may be extracted from the received media file. A hash function may be applied to a respective delta-frame of the number of extracted delta-frames to generate a delta-frame hash value for the respective delta-frame of the number of extracted delta-frames. The delta-frame hash value for the respective delta-frame of the number of extracted delta-frames into the message to be uploaded as the subsequent transaction.

In the foregoing examples, combinations of the intra-frame hash value, the delta-frame hash value, and/or the retrieved hash value may be used when generating the altered data hash value. Alternatively, the altered data hash value may be generated by application of the hash function to only an intra-frame, only a delta-frame, a combination of both, or may be generated using other identifiers or cryptographic key information related to the subscriber requesting confirmation or the owner of the retrieved media file, or the like. In an example, the altered data hash value of the altered media file may be stored in the blockchain platform at a media file address generated for the altered media file.

Returning to the example process 200 of FIG. 2, the altered media file may be stored in the media repository at a location related to the assigned location within the media repository (240). In an example, the related location may be associated with the assigned location.

In a further example, the processor may receive an authentication request from a subscriber requesting authentication of a media file. This may be a sub-process performed, such as when confirming the authenticity of a media file in step 225 of the process 200 example of FIG. 2. The processor may be in the subscriber device, the subscriber system, or the digital data lineage verification system. The authentication request may be an email, a website, a subscriber portal to a digital data lineage system, or the like. In an example, the authentication request may include a copy of the media file. In other examples, the authentication request may include a pointer or link to the copy of the media file.

In response to the authentication request, a portion of the content of the copy of the media file may be processed. For example, a processor may parse content in the copy of the media file to duplicate a portion of the content in the copy of the media file. The duplicated portion of the content may correspond to the portion of the content in the original version of the media file used to generate the original media file hash value. The duplicated portion of the content to obtain content may be processed to obtain content values, such as those related to encoded videos such as intra-frames or delta-frames. The obtained content values may be input into the hash function to generate the media file copy hash value.

When the duplicated portion of the content is processed, the processor may evaluate the portion of the content to determine whether the content is an image or a video. For example, the processor may access the received media file and utilize a video encoder to determine it the content includes intra-frames or delta-frames that indicate the content is video. Based on the determined presence of intra-frames or delta-frames, the processor may determine the received media file is a video file.

Returning to the authentication request example, the processed portion of the content of the copy of the media file may be used to determine whether the media file is a duplicate or an altered copy of a media file currently stored in the media repository. In response to a determination, the processor may output either a duplicate indication or an altered copy indication in response to a determination the media file is either a duplicate or an altered copy of a media file currently stored in the media repository.

It may be helpful to describe a process by which a media file may be present to the digital data lineage verification system for authentication and verification of the content and a source of the content of the media file.

In order to confirm the authenticity of the media file, a hash value stored in a message at a media file address may be retrieved from the blockchain platform by a digital data lineage verification system, such as 140 of FIG. 1 or a data verification application instance executing on a subscriber device or subscriber system, such as 101-103 or 120, respectively. In an example of a subscriber device, such as 101, application programming code, such as a local instance of a data verification application 111, may be stored in a memory 162 of a subscriber device 101. The application programming code may be executing on a processor 161 of a subscriber device 101. The application programming code, such as the local instance of a data verification application 111, may be operable to provide a graphical user interface.

The graphical user interface may be provided on a display device, such as 163. The display device 163 may for example be a touchscreen, a display screen responsive to a keyboard, an audio interface, or the like. The data verification application instance 111 upon receiving a request to evaluate, authenticate or present video (e.g., video to be provided by a streaming service or the like) may access the blockchain platform to request a hash value related to the entire video, particular frames of the video, or particular frames of encoded video. The data verification application instance 111 may calculate a hash value locally and compare the locally-calculated hash value with the requested hash value. Based on a result of the comparison, a warning may be presented on a display device of the subscriber device 101 if the result of the comparison indicates the video has been tampered with or altered in some manner since the time the requested hash was generated. For example, a pop-up window indicating that the video was altered or tampering with may be generated and presented.

Figure 3:
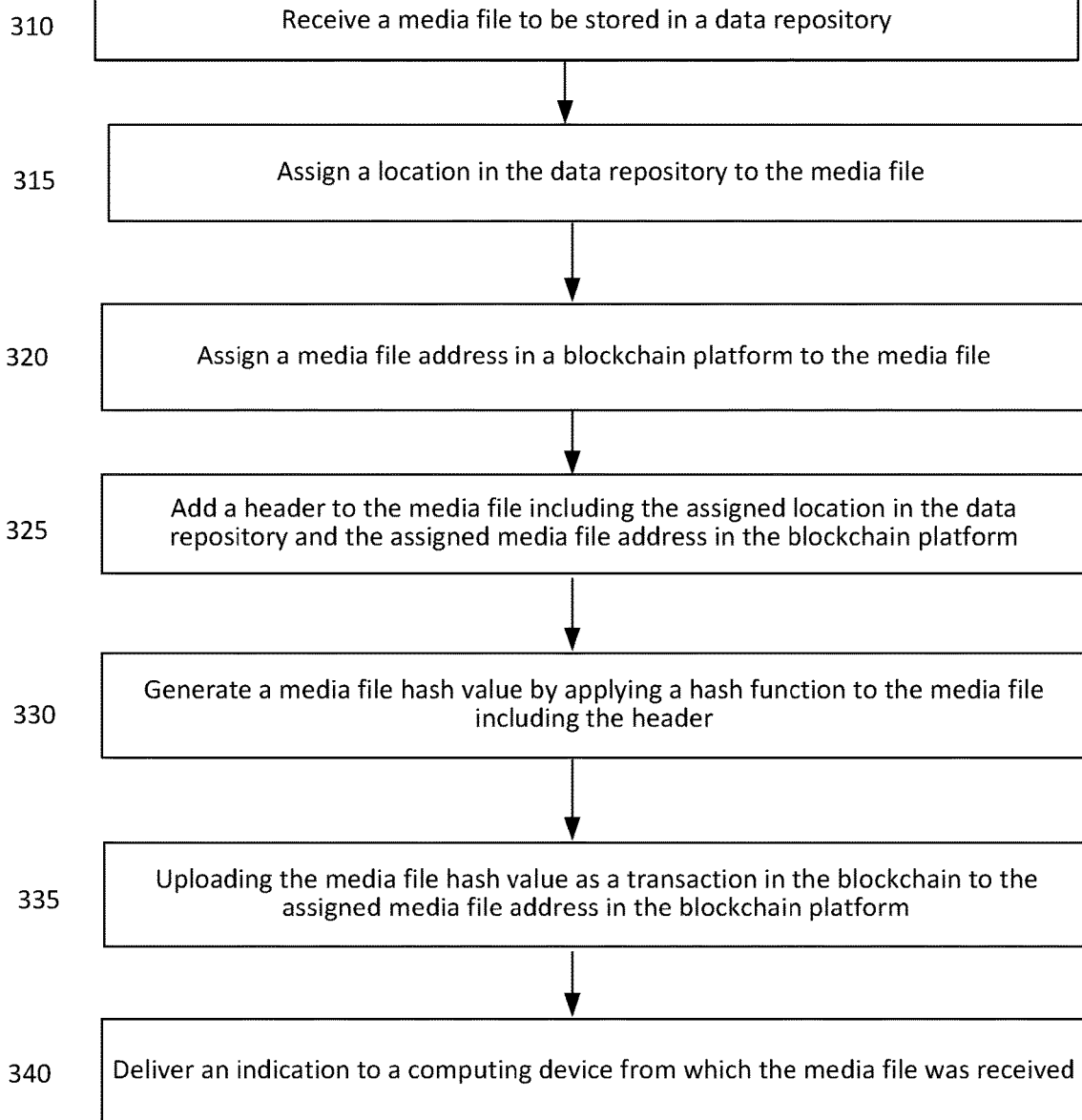
FIG. 3 illustrates a flow chart of an example of a method for processing a media file utilizing a system, such as the example system of FIG. 1.

Other examples for authenticating and modifying a media file utilizing the system example of FIG. 1 are envisioned. For example, FIG. 3 illustrates a flow chart of an example of a method for processing a media file utilizing a system, such as the example system of FIG. 1. In an example, a non-transitory computer-readable medium embodying programming code is provided to a computing device, such as a subscriber computing device, a media verification component, or the like. The example programming code when executed by a processor that causes the processor to perform functions and processes, such as process 300. In the process 300 example, the processor may be operable to receive a media file to be stored in a media repository (310). The processor upon execution of the programming code and in response to receiving the media file, the processor may generate a time stamp indicating when the media file was received. A subscriber associated with the received media file may be identified. For example, the subscriber may provide a subscriber identifier (e.g., a user name, an email address, a subscriber name, a serial number or the like) with the correspondence that accompanies the received media file.

The processor may, for example, access the media repository and may determine using, for example, the subscriber identifier or other information, the location in the media repository associated with the subscriber. The media file address in a blockchain platform may be associated with the subscriber, the time stamp, and the media file. A location in the media repository may be assigned to the media file (315). The location in the media repository assigned to the media file may be a memory address in the media repository data storage device or the like. A media file address in a blockchain platform may be assigned to the media file (320). The media file address may be determined based on a cryptographic key related to the subscriber that provides the media file to the digital data lineage verification system. At 325, metadata may be added to the media file. The metadata may include, for example, the assigned location in the media repository and the assigned media file address in the blockchain platform, or the like.

A media file hash value may be generated by applying a hash function to the media file, including the metadata (330). When determining what data should be input into the applied hash function, the processor may, for example, determine that the received media file is a video file that may include a number of intra-frames and delta-frames. Some of the numbers of intra-frames or delta-frames may be extracted from the media file. If only intra-frames are exacted, the hash function may be applied to a respective intra-frame extracted from the media file to generate an intra-frame hash value for the respective intra-frame. The intra-frame hash value for the respective intra-frame may be inserted into the message to be uploaded as the subsequent transaction.

Alternatively, a number of delta-frames may be extracted from the received media file. A hash function may be applied to a respective delta-frame of the number of extracted delta-frames to generate a delta-frame hash value for the respective delta-frame of the number of extracted delta-frames. The delta-frame hash value for the respective delta-frame of the number of extracted delta-frames may be included in the message to be uploaded as the subsequent transaction. Of course, a combination of intra-frames and delta-frames may be input into the hash function for generating the media file hash value.

The generated media file hash value, that includes either an intra-frame hash value or a delta-frame hash value for the respective extracted intra-frame or delta-frame of the number of extracted delta-frames, may be inserted into the message to be uploaded as the subsequent transaction to the blockchain. In a further example, a processor of the subscriber device or system or a component of the digital data lineage verification system may extract a number of delta-frames from the received media file and apply a hash function to a respective extracted delta-frame of the number of extracted delta-frames to generate a delta-frame hash value for the respective extracted delta-frame of the number of extracted delta-frames. Alternatively, or in addition, a number of intra-frames may be extracted from the received media file, and a hash function may be applied to a respective intra-frame of the number of extracted intra-frames to generate an intra-frame hash value.

At 335, the media file hash value may be uploaded to the assigned media file address in the blockchain platform as a transaction in the blockchain. For example, the delta-frame hash value for the respective delta-frame of the number of extracted delta-frames may be inserted into the message with the media file hash value to be uploaded as the transaction. Inputs to a graphical user interface provided by an instance of the data verification application may facilitate the uploading of step 335 as well as operations performed at other steps in the example of FIG. 3 as well as in other examples.

An indication may be delivered to a subscriber device from which the media file was received (340). The indication indicates the media file is uploaded to the media repository and a state of the media file is a secured state. For example, an authentication result may be output by a component of the digital data lineage system or an instance of the data verification application evaluating the authenticity of the media file when a match between the original media file hash and the media file copy hash value is determined by the comparison.

In a further example, the processor may perform additional functions, for example, upon receiving the media file and identifying the subscriber who provided the received media file, the processor may update a state status of the media file in a subscriber profile associated with a subscriber wherein the state status of the media is file is one of a secured state, an altered state, or a duplicate state. For example, a secured state may indicate that the content of the media file has been preserved based on the uploading of the transaction to the blockchain platform, an altered state may indicate that a portion of the content of the media file has been altered from a prior version of the media file, or a duplicate copy indicating that the media repository includes a copy of the media file that is associated with another subscriber. Of course, other states may also be used, such a corrupted state, a pirated state, or the like.

The foregoing discussion of FIGS. 2 and 3 provide examples for securing a media file for authentication and verification. The following example provides a discussion of techniques that utilize the blockchain platform as an auxiliary mechanism for confirming the authenticity of a media file presented as an original and verification of the source of the media file being asserted as an original. In this example, As described above, when securing a video according to the described examples, a video, which is made of a number of individual frames, may be encoded into intra-frames and delta-frames. The intra-frames may, for example, be a subset of the individual frames of the complete video that have a complete set of data for the entire frame, and the delta-frames may include, for example, a partial set of data indicating changes from a previous intra-frame or an immediately, prior delta-frame. Since hash values are being used to securely identify a media file, a system, such as the digital data lineage verification, may apply a hash function to only a small portion of the encoded video as well as other parts of the media file, such as the metadata. In an example, each frame of the video may be input to a hash function (or a hash function may be applied to each from) to generate a frame hash value and another hash function may be applied to all of the frame hash values. For example, with respect to the applying a hash function to the video, a particular delta-frame, such as the 1000th delta-frame in the encoded video or the like, may be selected, or multiple delta-frames may be selected for application to a hash function.

Examples of hash functions may be SHA-224, SHA-256, SHA-384, SHA-512, SHA-512/224, SHA-512/256, or the like. Portions of the data, which may include all of the data, in the selected delta-frame may be hashed using the hash function to provide an original media hash value that is used to authenticate or verify a video. When authenticating a media file received from a subscriber, a data verification application instance, either executed by the digital data lineage verification system or executed locally on a subscriber device or system, may retrieve a hash value related to the media file, such as the original media file hash value, from a transaction in the blockchain platform at the media file address. In an example, the hash value related to the media file (i.e., the original media file hash value) may be stored in a message within the transaction at the media file address in the blockchain of the blockchain platform.

In the example, the media file presented for authentication has the hash function applied to the same portions as the original video. The resulting hash value may be compared to the original media file hash value retrieved from the blockchain platform. If the resulting hash value matches or is within a predetermined range of the original media file hash, the presented video may be authenticated as matching. However, if the resulting hash value does not match and is not within a predetermined range of the original media file hash, the presented video is not authenticated as matching.

In another example, the original media file hash may include a number of hashes, such as a metadata hash value, a delta-frame hash value, or a video hash value, that are hash values that are appended to one another and stored in a message uploaded to the blockchain platform. Each hash value may be a specific hash value particular to a single element of the media file. For example, the metadata hash value may be a hash value generated by applying a hash function to the metadata of the media file, the delta-frame hash value may be a hash value generated by applying a hash function to specific delta-frames of the video of the media file, and the video hash may be a hash value generated by applying a hash function to specific intra-frames and/or delta-frames of the video of the media file. Of course, the hash function may be applied to other data within the media file.

In a further example, using the latest block in the blockchain, a user may be able to traverse back to the earlier blocks containing earlier versions of the media file. A hash applied by the author (i.e., source) of the media file may sign it electronically. Note that the author or source may be a computer application, an editor in a movie production studio, or the like.

In an example, the length of a video may vary, and as a result, the size of the media file may also vary. It is envisioned that long videos, such as hours of surveillance video taken from a security camera, for example, may have multiple hash values taken at intervals of the video. The intervals may be randomly calculated by the data verification application or may be hourly, minute based, event-based (e.g., drastic change in content or the like), or based on some other interval selection method.

In an example of a video streaming service, the video streaming service may implement an application such as the data verification application for use while delivering to a receiving device, such as a subscriber device or a subscriber system. In this example, the subscriber system may be as a streaming video service that utilizes an application that incorporates an instance of the data verification application and a video codec (i.e., coder/decoder). The video encoder of the video codec may calculate a hash value using data from a first portion of the streaming video, such as the first five minutes of the streaming video (including audio in another example). The streaming service application may submit the hash value of the first portion of the streaming video to the blockchain and continue to deliver video to a receiver. The receiver may utilize the hash value of the first portion to confirm the authenticity of the streaming video, the receiver may contact the blockchain platform and access the blockchain with a request for the calculated hash value.

The receiver, while decoding the streaming video, may locally calculate the hash value of the corresponding first portion and compare the locally-calculated hash value to the requested hash value to authenticate the video. This could be done periodically as the video is being streamed from the source to the receiver. For example, the source may be a subscriber device, and may continue sending hash values to the blockchain as the source processes the video for delivery of the video to the receiver. The period for transmitting the video from the supplier of the video to the receiver may be brief, such as three seconds or the like. As a result, the blockchain has to respond quickly and also verify the result of a transaction and append the transaction to a block of transactions within the same brief period of the transmission between sender and receiver.

In an example, a private implementation may not require a blockchain but may implement the service utilizing a database and known security features. For example, the receiver logs onto the authentication server authenticates itself to the authentication server. Upon successful authentication, the receiver may be given access to the hash values for comparison of a hash value generated based on information obtained from the media file presented for verification with hash values associated with a media file in the database.

In another example, a subsequent manipulation (e.g., alteration or modification) of the media file may be recorded in the blockchain platform indicating changes to the original media. For example, social media can be used to spread false information. Part of the false information may involve the digital manipulation or editing of media files. An advantage of the described examples is that storage of the digital media files and the respective metadata usage information is immutable and verifiable. To verify the digital media used in social media, the system would support verification of the digital media by describing the lineage of the media. The original digital media can be stored in the system, along with any subsequent manipulation.

Figure 4:
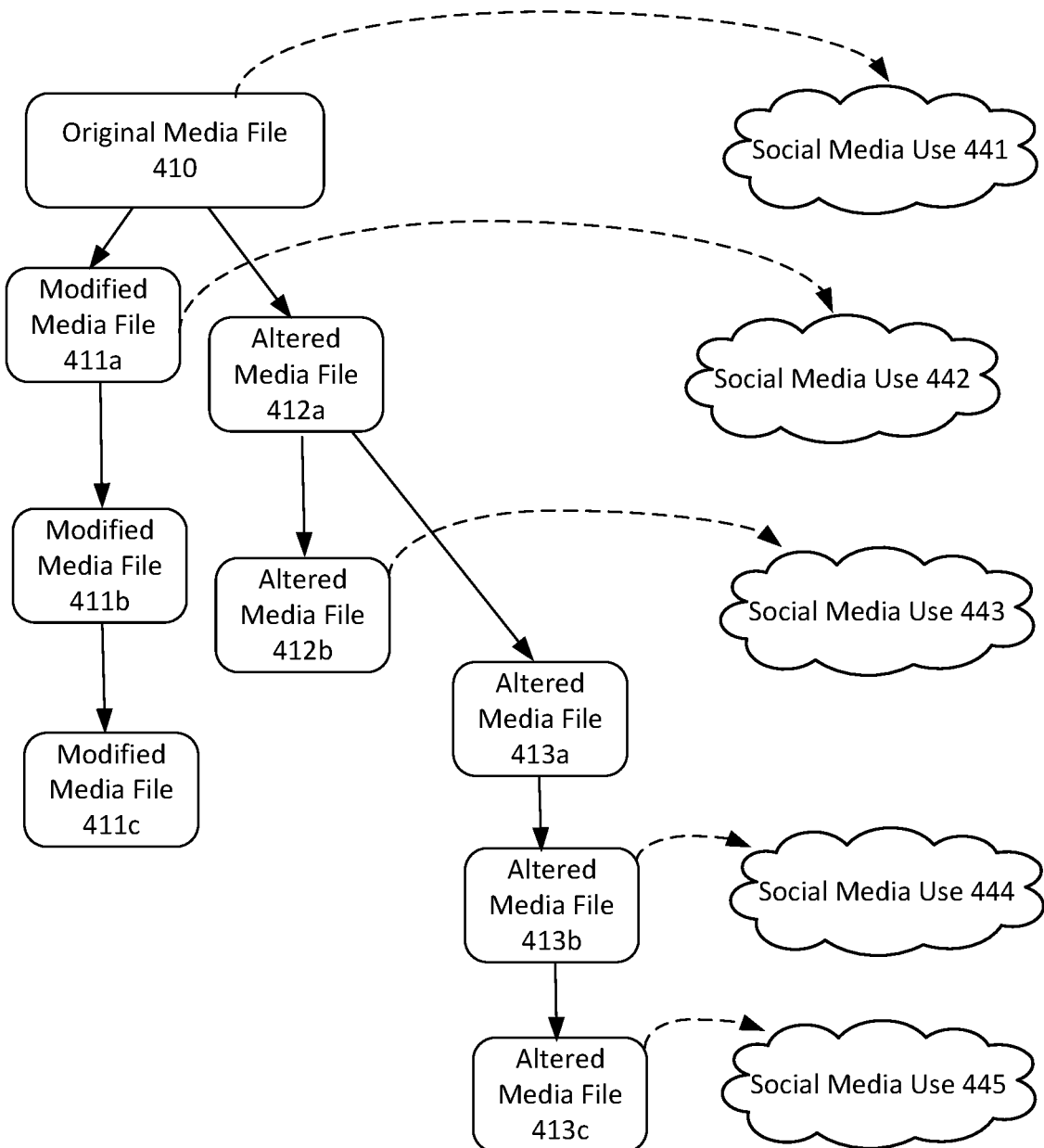
FIG. 4 illustrates an example of a social media usage verification of an original media file.

FIG. 4 illustrates an example of a social media usage verification of an original media file. In the example, an original media file 410 may have content such audio, image or video content. The metadata of the original media file may include information related to where and when the content was used may be recorded in a media repository of a digital data lineage verification system with additional information, such as an original media file hash value stored in a blockchain platform. In the example, a copy of original media file may be used in social media, such as social media use 441. In the example, the blockchain may be updated with a transaction associated with the original media file. The transaction may include information related to the media was used and if the media was changed in any way via digital editing. In the example, the original media file 410 may be modified in some way by a subscriber device, such as 101 of FIG. 1, that has access to a copy of the original media file 410. For example, the subscriber device may modify content in the modified media file 411a and also attribute some of the modified content to another author in addition to the author of the original media file 410. The modified media file 411a may be used in social media use 442 (e.g., posted up on a business social media page or the like). As discussed above, the subscriber device may by utilizing a data verification application apply a hash function to portions of the modified media file 411a. The hash values resulting from the application of the hash function to the portions of the modified media file 411a may be uploaded in a message in a transaction to the blockchain in the blockchain platform. In subsequent operations, different subscriber devices may further modify the modified media file 411a.

For example, another subscriber device may modify the modified media file 411b. The other subscriber device may utilize a data verification application process the modified media file 411b as described with reference to the examples of FIGS. 2 and 3. In addition, the data verification application may further include information or hash values related to where the media was used, and when the media was used.

In a further example, a subscriber system, such as 120 of FIG. 1, may modify the modified media file 411b to generate modified media file 411c. The subscriber system may access the blockchain to determine prior to modifying media file 411b how media file 411b was modified from the original media file 410 by retrieving transactions related to the media file 411b that indicate whether content or metadata was modified and how. For example, messages (described in more detail with the examples of FIGS. 5 and 6) stored as transactions in the blockchain may have information that indicates the modifications to the original media file 410. These messages may be retrieved by the subscriber system, which may identify the modifications and perform further modifications. The data verification application instance executed by the subscriber system may process the further modifications and upload the results of the processing the modifications to the blockchain.

In a similar example, a first subscriber device may alter the original media file 410 to create altered media file 412*a*. In response to creating altered media file 412*a*, the first subscriber device may upload a message in a blockchain transaction to the media file address related to the original media file 410 in the blockchain platform. The message may include an indication of altered data (e.g., metadata or content) within the altered media file 412*a*. As mentioned in the example of FIG. 2, the altered media file 412*a* may be stored in the media repository at a memory address location related to the assigned location within the media repository (e.g., 145 of FIG. 1) of the original media file 410 within the media repository.

A second subscriber device may be interested in using the altered media file 412*a* in a social media posting. The second subscriber device may retrieve a copy of the altered media file 412*a* as altered media file 412*b*. Altered media file 412*b* may be processed by the second subscriber device to include information in a message in the blockchain related to the posting in the social media use 443, an identifier associated with the second subscriber device, such as a digital wallet address of the second subscriber device or the like, and similar information as discussed with reference to the examples of FIGS. 2 and 3. In subsequent operations, the altered media file 412*a* may be further altered to create altered media file 413*a* by a third subscriber device. Altered media file 413*a* may be stored in the media repository and information related to the altered media file 413*a* including information related to the alterations to the altered media file 413*a* may be uploaded to the blockchain.

In further operations, the altered media file 413*a* may retrieved by a fourth subscriber device and altered to create altered media file 413*b*. The fourth subscriber device may upload the altered media file 413*b* in a further social media use 444. Similar to earlier alterations (or modifications), the alterations may be to content or metadata.

In a last use of the altered media file 413*b*, altered media file 413*c* may be created through a modification or alteration by a fifth subscriber device for use in the social media use 445. The altered media file 413*c* may be stored in the media repository and information related to the alterations, the fifth subscriber device, the social media use 455 may be uploaded to the blockchain.

A subsequent subscriber, such as a sixth subscriber device, may be able to retrieve the altered media file 413*c*. The sixth subscriber device by executing an instance of the data verification application may be able to access transactions in the blockchain based on information, such as hash values, obtained using the altered media file 413*c*. The transactions may provide further information, such as transaction information or hash information, blockchain address information and the like, that ultimately enables the sixth subscriber device to obtain the content of the original media file 410 that was the source of altered media files 412*a* and 413*a-c*. In addition, the blockchain maintains information such as which social media outlet any of the altered media files 412*a* and 413*a-c* as well as original media file 410 was posted, along with any subsequent usage, editing, and other postings (e.g., to a website or the like). The system shows the lineage of the digital media, so the digital media can be verified.

Referring to FIG. 1, the blockchain platform 133 provides a secure location to store information related to the media files maintained in the media repository 145 of the digital data lineage verification system 140. It may be beneficial at this time to provide a discussion of the blockchain platform 133 and an example of the operation of the blockchain with reference to FIGS. 5 and 6.

Figure 5:
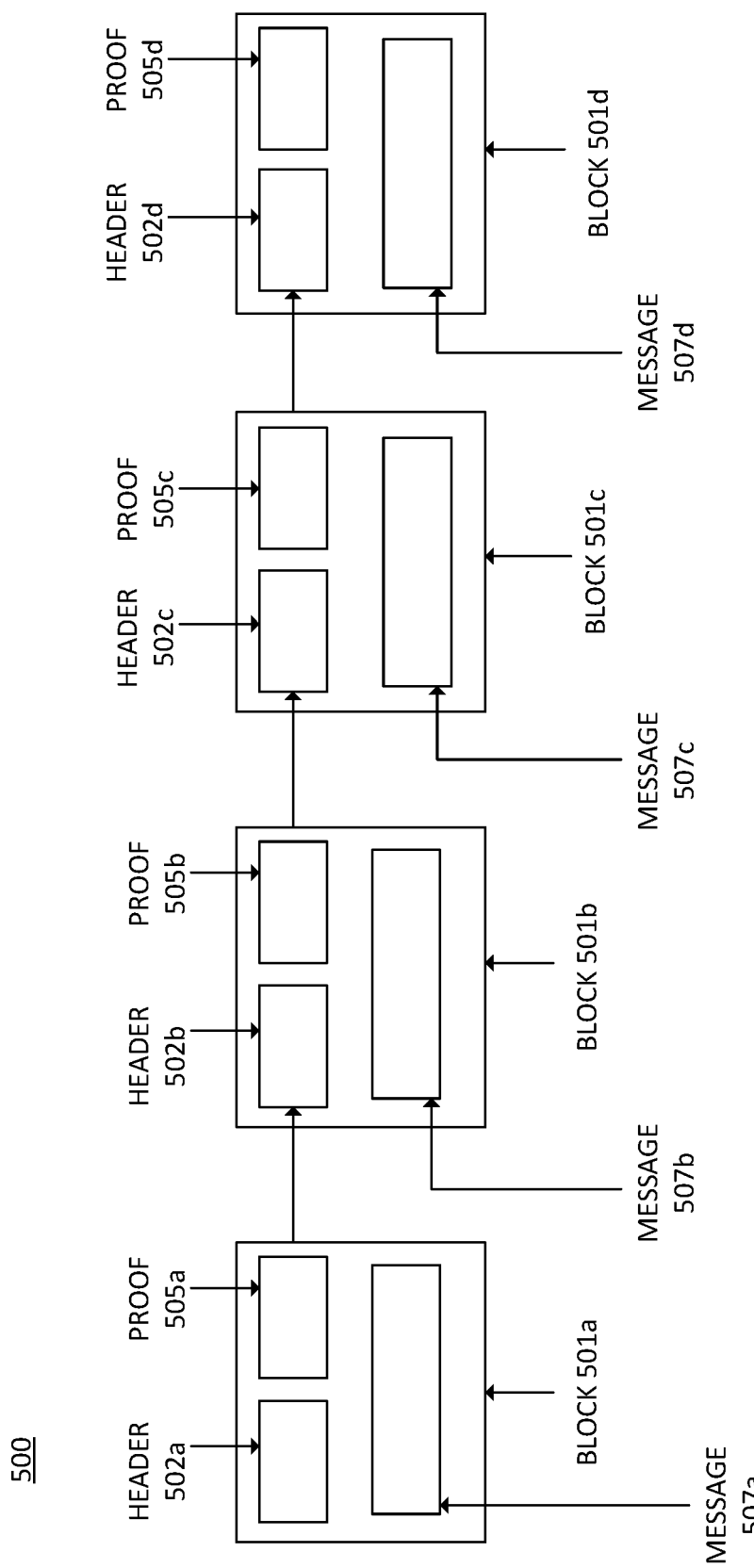
FIG. 5 depicts a logical model of an example of a blockchain suitable for use with the disclosed examples.

FIG. 5 depicts a logical model 500 of an example of a blockchain such as a blockchain implemented by blockchain platform 133. Blockchain platform 133 may include many such blockchains maintained by many different systems (e.g., subscriber system 120, or other systems). Such blockchain examples may include blocks, such as blocks 501*a*-501*d*. Each block 501*a*-501*d* may also be referred to as a transaction. Blocks may include messages, such as messages 507*a*, 507*b*, 507*c* and 507*d*. The blocks 501*a*-501*d* may represent a single transaction or media file. Generally, blocks may include a media file address, such as media file addresses 502*a*-502*d*, which uniquely identifies each block. The media file addresses 502*a*-502*d* may include a hash value generated by a hash function that receives a private cryptographic key as an input. The media file address is typically shorter than the private cryptographic key. A hash function is any function that can be used to map input data of arbitrary size to a hash value of a fixed size. For example, a media file address may include at least one of the previous block's hash value, a hash value generated based on any messages in the block (e.g., a Merkle root), and a timestamp. In an example, blockchain platform 133 may require that blocks added to blockchain platform 133 satisfy at least one of a proof-of-work condition and a digital signature condition. For example, the media file addresses 502*a*-502*d* may include a nonce (e.g., a random number generated by a random number generator) chosen to ensure the media file address satisfies the proof-of-work condition.

As a non-limiting example, the proof-of-work condition may require the hash of the media file address fall within a predetermined range of values. As an additional example, the media file address may be digitally signed with a cryptographic key of an authorized system (i.e., a subscriber system or subscriber device), and the digital signature may be included in the media file address. This digital signature may be verified using a key available to the subscribers, such as subscriber devices 101-103 and subscriber system 120 of system 100. In the illustrated example, proof-of-work block verification may be included in the respective block 501*a*-501*d* in a proof field 505*a*-505*d*, respectively. While proof-of-work block verification and validation is described in the example, other block verification and validation algorithms, such as proof-of-stake, proof-of-capacity, proof-of-elapsed-time, or the like, may be used.

Figure 6:
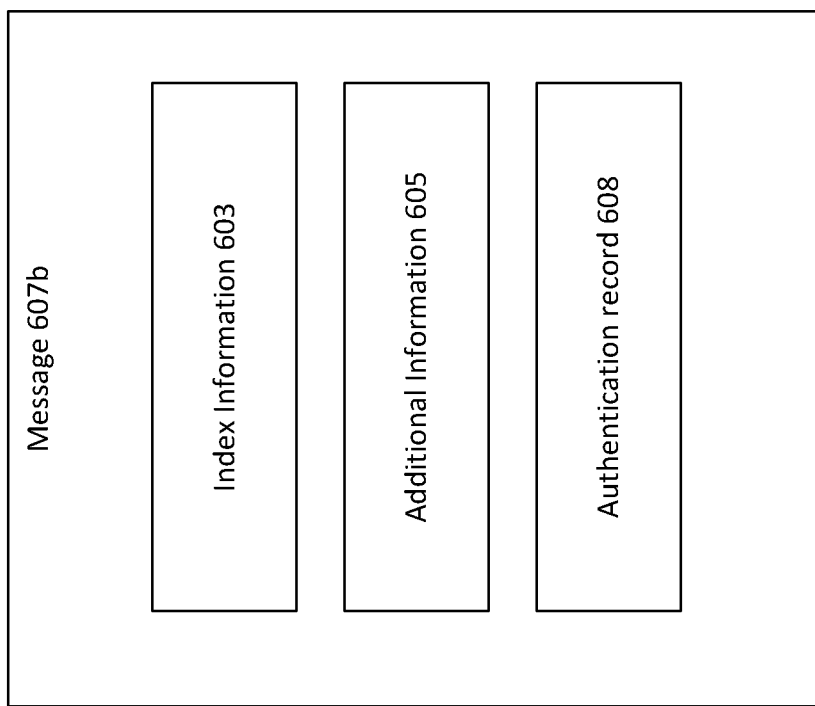
FIG. 6 depicts a logical model of a message stored in a blockchain suitable for use with the disclosed examples.

FIG. 6 depicts a logical model of a message 607*b* stored in a blockchain (e.g., copies of which are stored in the distributed ledger data storage 154, 156 and 158 of blockchain platform 133), consistent with disclosed examples. In some examples, message 607*b* may include index information 603. In certain examples, index information 603 may include information identifying a subscriber associated with a subscriber device or subscriber system. For example, index information 603 may be at least one of a subscriber identifier, a full name, email address, phone number, or other non-sensitive personal information of the user. In various examples, index information 603 may include one or more references to earlier blocks in the private blockchain. For example, index information 603 may include one or more references to one or more earlier blocks associated with the same subscriber, same subscriber device, same subscriber system, or the same media file. A reference to one or more earlier blocks may include, as a non-limiting example, a hash of a preceding block or transaction in the blockchain associated with the same subscriber, same subscriber device, same subscriber system, or the same media file. In some examples, index information 603 may be obfuscated or encrypted according to methods known to one of skill in the art. For example, index information 603 may be encrypted with a cryptographic key. As an additional example, index information 603 may include a hash of the at least one of a full name, email address, phone number, or other non-sensitive personal information of the user.

Message 607b may include additional information 605, consistent with disclosed examples. The additional information 605 may include a subscriber identifier, a media file address, an identifier associated with the media file. In various examples, additional information 605 may be obfuscated or encrypted according to methods known to one of skill in the art. For example, additional information 605 may be encrypted with a cryptographic key.

Message 607b may include an authentication record 608. In an example, the authentication record 608 may include information enabling subsequent auditing of transactions. For example, authentication record 608 may identify at least one of the subscriber devices or systems that is requesting verification or authentication of a media file, an enterprise, such as a financial institution, associated with the respective subscriber device or system, a purpose of the authentication request (e.g., the media file was presented to the subscriber for publication or the like), a result of the authentication request (e.g., the presented media file was authentic, the presented media file was altered, the presented media file belonged to a different source than the source that provided the media file to the requesting subscriber, or the like), and information related to the authentication request (e.g., time stamp, date stamp, the authentication request number or the like).

In some examples, authentication record 608 may be obfuscated or encrypted according to methods known to one of skill in the art. For example, authentication record 608 may be encrypted with a cryptographic key related to the requesting subscriber or related to the digital data lineage verification system.

In the examples, cryptographic keys may be used to encrypt elements of messages in blocks. In some examples, such cryptographic keys may be associated with subscribers (e.g., subscriber system 120 or subscriber devices 101-103) of digital data lineage verification system 140. In various examples, at least some of the cryptographic keys may be associated with authorized systems. Corresponding cryptographic keys may be available to decrypt the encrypted message elements, consistent with disclosed examples. For example, when an element of a message in a block is encrypted with a symmetric key, the same symmetric key may be available for decrypting the encrypted element. As another example, when an element of a message in a block is encrypted with a private key, a corresponding public key may be available for decrypting the encrypted element. In some examples, the corresponding cryptographic keys may be available to subscribers (e.g., subscriber system 120 or subscriber devices 101-103) of the digital data lineage verification system 140 of FIG. 1.

Figure 7:
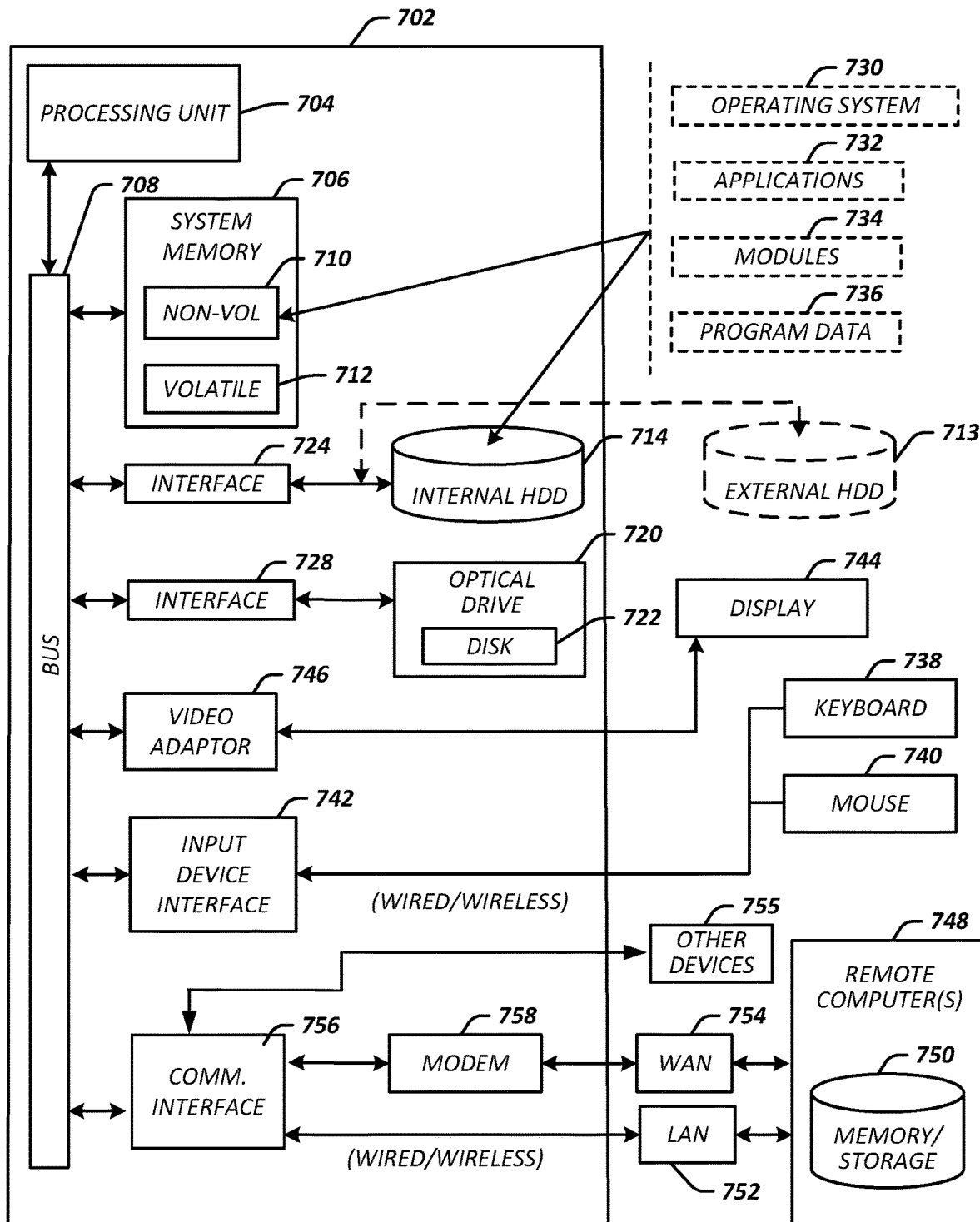
FIG. 7 illustrates an example of a computing architecture suitable for implementing the examples illustrated in FIGS. 1-6.

FIG. 7 illustrates an example of a computing architecture 700 suitable for implementing various examples as previously described. In one example, the computing architecture 700 may include or be implemented as part of system 100.

As used in this application, the terms "system" and "component" are intended to refer to a computer-related entity, either hardware, a combination of hardware and software, software, or software in execution, examples of which are provided by the computing architecture 700 example. For example, the computing architecture 700 is shown having various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The examples, however, are not limited to implementation by the computing architecture 700.

As shown in FIG. 7, the computing architecture 700 includes a processing unit 704, a system memory 706 and a system bus 708. The processing unit 704 can be any of various commercially available processors.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Examples may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the example shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal hard disk drive (HDD) 714 (or external hard disk drive (HDD) 713) and an optical disk drive 720 to read from or write to a removable optical disk 722 (e.g., a CD-ROM or DVD). In an example, the HDD 714 or 713 may be solid state drives (SSD). The HDD 714 or 713 and optical disk drive 720 can be connected to the system bus 708 by an HDD interface 724 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of computer program modules can be stored in the drives and memory 710, 712, including an operating system 730, one or more application programs 732, other program modules 734, and program data 736. In one example, the one or more application programs 732, other program modules 734, and program data 736 can include, for example, the various applications and/or components of the computing architecture 700. For example, a video decoder or video encoder module may be one of the other program modules 734 that is provided in the computing architecture 700. The video encoder module may be operable to encode video into intra-frames and delta-frames in encoded video of a media file. Conversely, a video decoder may be operable to decode the encoded video into the original video for presentation on a display device of a subscriber device, such as 101-103, or the like.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 704 through communication interface 756 that is coupled to the system bus 708 but can be connected by other interfaces such as a parallel port, IEEE 1394 serial port, a game port, a USB port, an IR interface, and so forth.

A display 744, which may be a touchscreen display or another type of display device, is also connected to the system bus 708 via an interface, such as a video adaptor 746. The display 744 may be internal or external to the computer 702. In addition to the display 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface 756. The communication interface 756 can facilitate wire and/or wireless communications to the LAN 752, which may also include a wireless access point disposed thereon for communicating with the wireless functionality of the communication interface 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, such as a radio frequency transceiver, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The communication interface 756 may include one or more radio frequency or optical transceivers that enable wireless communication between the computer 702 and other devices 755. The other devices 755 may be cellular, Wi-Fi, Bluetooth™ or other data networks. For example, the computer 702 may be operable to communicate via the communication interface 756 with wired and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices via the communication interface. For example, Wi-Fi networks use radio technologies called IEEE 802.11x (a, b, g, n, etc.) to provide secure, reliable, fast wireless connectivity. A Wi-Fi network may be used to connect computers to each other, to the Internet, and to wired networks (which may use IEEE 802.3-related media and functions).

The subscriber devices, such as 101-103, subscriber system, such as 120, the enterprise nodes, such as 151, 155 and enterprise server 153 of the blockchain platform 133, the data verification application server 147, the digital data lineage verification system 140, and other computing devices in the above examples shown in FIGS. 1-5 may include various hardware elements, software elements, or a combination of both, including those described with reference to FIG. 7. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, processes, software interfaces, application program interfaces (API), instruction sets, computing code, computer code, code segments, computer code segments, words, values, symbols, or any combination thereof. However, determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
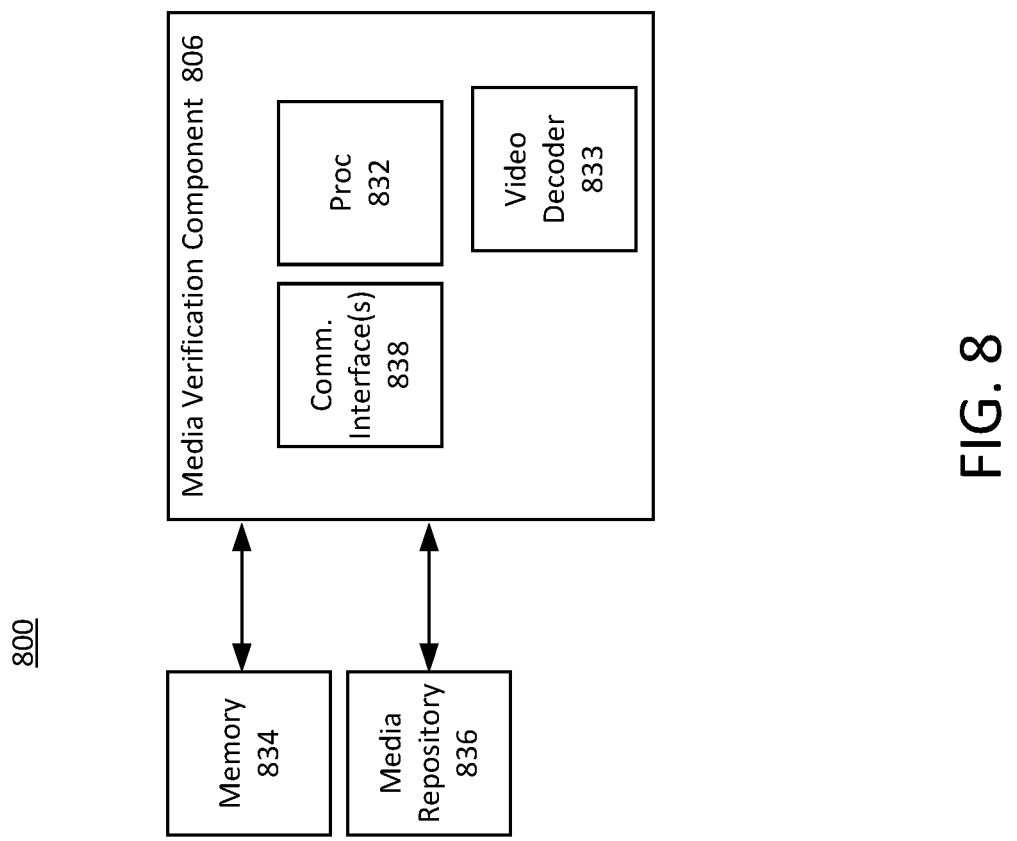
FIG. 8 illustrates an example of an apparatus operable to provide the example processes illustrated in the examples of FIGS. 2 and 3.

FIG. 8 illustrates an example of an apparatus operable to provide an example of the media verification component. For example, the apparatus 800 includes the media verification component 806, a memory 834, and a media repository 836. The media repository 836 is structurally and functionally similar to the media repository 145 of FIG. 1 so no further description is provided. The media verification component 806 may include a processor 832, a video decoder 833, and communication interfaces 838. The processor 832 may be operable to execute computer programming to provide functions such as those described with reference to the examples of FIGS. 2 and 3. The communication interfaces 838 may enable the media verification component 806 to exchange communications with, for example, with reference to FIG. 1, the data verification application server 147, subscriber devices 101-103, a subscriber system 120, the blockchain platform 133 via the enterprise network 141 and/or the data network 130. The video decoder 833 may be operable to receive a media file containing video data for verification and authentication from, for example, a subscriber device via a communication interface of the communication interfaces 838. The video decoder 833 may be operable to process the received media file into intra-frames and delta-frames for processing of the respective delta-frames, intra-frames, or combination of intra-frames and delta-frames according to the authentication and verification techniques described herein. Using the intra-frames and delta-frames, the processor 832 may execute programming code stored in the memory 834 and utilize techniques described with reference to earlier examples to authenticate and verify the media file as authentic and belonging to the source asserted by the subscribing device as owning or supplying the media file. While the foregoing is a brief description of the apparatus 800 suitable for implementing processes to provide a digital data lineage verification service such as that described herein.

It will be appreciated that the example devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided among or omitted from examples.

At least one computer-readable storage medium may include instructions that, when executed, cause a system to perform any of the computer-implemented methods described herein.

Some examples may be described using the expression "one example" or "an example" along with their derivatives. These terms mean that a particular feature, structure, or characteristic described in connection with the example is included in at least one example. The appearances of the phrase "in one example" in various places in the specification are not necessarily all referring to the same example.

Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program processes executed on a computer or network of computers. These procedural descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more examples. Rather, the operations are machine operations.

Some examples may be described using the expression "coupled" and "connected" along with their derivatives. These terms are not necessarily intended as synonyms for each other. For example, some examples may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

As used in this application, the terms "system" and "component" are intended to refer to a computer-related entity, either hardware, a combination of hardware and software, software, or software in execution, examples of which are provided by the examples in FIGS. 1-8. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server or processor and the server or processor can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

Various examples also relate to apparatus or systems for performing these operations. This apparatus may be specially constructed for the described purpose and may be selectively activated or reconfigured by a computer program stored in the computer. The processes presented herein are not inherently related to a particular computer or other apparatus. The suitable structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example for streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications, and variations that fall within the spirit and scope of the appended claims.

What is claimed is:

1. A system, comprising:
    a blockchain platform having a plurality of transactions stored in a blockchain formed from blocks of records containing the transactions;
    a media repository comprises memory, is operable to store media files, and is coupled to the blockchain platform; and
    a media verification component including a processor operable to execute application programming code,
    wherein upon execution of the application programming code by the processor, the processor is operable to:
        receive a media file to be authenticated, wherein the media file is to be authenticated as unaltered and owned by a source of the media file, wherein the media file comprises intra-frames;
        generate a resulting hash value from the media file by applying a hash function of the received media file;
        search the blockchain platform for a transaction including an original media file hash that matches the resulting hash value generated from the media file;
        based on a result of the search, generate an indication that the media file is unaltered or owned by a source of the media file;
        extract intra-frames from the media file;
        apply the hash function to a respective extracted intra-frame to generate an intra-frame hash value for the respective extracted intra-frame; and
        insert the intra-frame hash value for the respective extracted intra-frame into a message to be uploaded with the original media file hash in the transaction.

2. The system of claim 1, wherein upon execution of the application programming code by the processor, the processor is further operable to:
    determine that the transaction in the blockchain platform found in the search includes a media file address related to an entity that owns the media file.

3. The system of claim 1, wherein upon execution of the application programming code by the processor, the processor is further operable to:
    determine that the transaction in the blockchain platform found in the search includes an indication of status information related to the media file, wherein the status information includes at least one of a timestamp related to storing of the media file in the media repository, an indication of a size of the media file, an indication of a format of content of the media file, or a reference to the source of the media file.

4. The system of claim 1, wherein upon execution of the application programming code by the processor, the processor is further operable to:
    in response to another result of the search, generate an indication that the media file is altered or not owned by the source of the media file.

5. The system of claim 1, wherein upon execution of the application programming code by the processor, the processor when generating the resulting hash from the media file is further operable to:
    apply an authentication hash function to the media file; and
    obtain an authentication hash value to be used as the resulting hash value.

6. The system of claim 1, wherein the media file to be authenticated is one of:
    a surveillance video of a physical location related to an entity, a trusted document related to an entity, an image generated by a camera, a graphic image, a contract document, a manuscript, a bank record, a conversation transcript, or an identification of a person.

7. The system of claim 1, wherein upon execution of the application programming code, the processor is further operable to:
    determine the media file to be authenticated is a video file, wherein the media file comprises delta-frames.

8. A method comprising:
    receiving a media file to be authenticated, wherein the media file is to be authenticated as unaltered and owned by a source of the media file, wherein the media file comprises intra-frames;
    generating a resulting hash value from the media file by applying a hash function of the received media file;
    searching a blockchain platform for a transaction including an original media file hash that matches the resulting hash value generated from the media file;
    based on a result of the search, generating an indication that the media file is unaltered or owned by a source of the media file;
    extracting intra-frames from the media file;
    applying the hash function to a respective extracted intra-frame to generate an intra-frame hash value for the respective extracted intra-frame; and
    inserting the intra-frame hash value for the respective extracted intra-frame into a message to be uploaded with the original media file hash in the transaction.

9. The method of claim 8, further comprising:
determining that the transaction in the blockchain platform found in the search includes a media file address related to an entity that owns the media file.

10. The method of claim 8, further comprises:
determining that the transaction in the blockchain platform found in the search includes an indication of status information related to the media file, wherein the status information includes at least one of: a timestamp related to storing of the media file in a media repository, an indication of a size of the media file, an indication of a format of content of the media file, or a reference to the source of the media file.

11. The method of claim 8, further comprising:
in response to another result of the search, generating an indication that the media file is altered or not owned by the source of the media file.

12. The method of claim 8, when generating the resulting hash from the media file further comprises:
applying an authentication hash function to the media file; and
obtaining an authentication hash value to be used as the resulting hash value.

13. The method of claim 8, wherein the media file to be authenticated is one of:
a surveillance video of a physical location related to an entity, a trusted document related to an entity, an image generated by a camera, a graphic image, a contract document, a manuscript, a bank record, a conversation transcript, or an identification of a person.

14. The method of claim 8, further comprising:
determining the media file to be authenticated is a video file, wherein the media file comprises delta-frames.

15. A non-transitory computer readable medium embodied with programming code that when executed by a processor causes the processor to:
receive a media file to be authenticated, wherein the media file is to be authenticated as unaltered and owned by a source of the media file, wherein the media file comprises intra-frames;
generate a resulting hash value from the media file by applying a hash function of the received media file;
search a blockchain platform for a transaction including an original media file hash that matches the resulting hash value generated from the media file;
based on a result of the search, generate an indication that the media file is unaltered or owned by a source of the media file;
extract intra-frames from the media file;
apply the hash function to a respective extracted intra-frame to generate an intra-frame hash value for the respective extracted intra-frame; and
insert the intra-frame hash value for the respective extracted intra-frame into a message to be uploaded with the original media file hash in the transaction.

16. The non-transitory computer readable medium of claim 15, wherein further comprising programming code that when executed by a processor causes the processor to:
determine that the transaction in the blockchain platform found in the search includes a media file address related to an entity that owns the media file.

17. The non-transitory computer readable medium of claim 15, wherein further comprising programming code that when executed by a processor causes the processor to:
determine that the transaction in the blockchain platform found in the search includes an indication of status information related to the media file, wherein the status information includes at least one of: a timestamp related to storing of the media file in a media repository, an indication of a size of the media file, an indication of a format of content of the media file, or a reference to the source of the media file.

18. The non-transitory computer readable medium of claim 15, wherein further comprising programming code that when executed to generate the resulting hash from the media file by a processor causes the processor to:
apply an authentication hash function to the media file; and
obtain an authentication hash value to be used as the resulting hash value.

* * * * *